United States Patent [19]
Angelbeck et al.

[11] Patent Number: 4,733,046
[45] Date of Patent: Mar. 22, 1988

[54] PRESSURE-TIGHT VACUUM CHAMBER OF AN ELECTRON BEAM ENGRAVING MACHINE FOR ELECTRON BEAM ENGRAVING OF PRINTING CYLINDERS FOR PRINTING TECHNOLOGY

[75] Inventors: Rolf Angelbeck, Kiel; Reinhard Gesell, Schonkirchen; Hans Penza, Preetz, all of Fed. Rep. of Germany

[73] Assignee: Dr. Ing. Rudolf Hell GmbH, Fed. Rep. of Germany

[21] Appl. No.: 931,444

[22] PCT Filed: Jul., 1986

[86] PCT No.: PCT/DE86/00001

§ 371 Date: Aug. 28, 1986

§ 102(e) Date: Aug. 28, 1986

[87] PCT Pub. No.: WO86/04282

PCT Pub. Date: Jul. 31, 1986

[30] Foreign Application Priority Data

Jan. 15, 1985 [DE] Fed. Rep. of Germany ....... 3501040
Jan. 16, 1985 [DE] Fed. Rep. of Germany ....... 3501164

[51] Int. Cl.⁴ ............................................. B23K 15/00
[52] U.S. Cl. ......................... 219/121 EL; 219/121 EJ
[58] Field of Search ................. 219/121 EL, 121 EN, 219/121 EJ, 121 EK

[56] References Cited

U.S. PATENT DOCUMENTS

3,483,351 12/1969 Wood ........................... 219/121 EN
3,610,872 10/1971 Sciaky ........................... 219/121 EB Primary Examiner—C. L. Albritton
Attorney, Agent, or Firm—Hill, Van Santen, Steadman & Simpson

[57] ABSTRACT

Pressure-tight vacuum chamber of an electron beam engraving machine for the acceptance of printing cylinders to be engraved, comprising a lower part similar to a machine bed, comprising a pressure-tight vacuum hood put in place on said lower part which is fashioned as a barrel-like arch and which is put in place on a sealing lip surrounding said lower part at its upper edge, comprising a loading opening for the printing cylinders situated in the upper central region of said hood and extending in longitudinal direction of said hood, comprising a cover lowerable into the loading opening and sealing with the loading opening, and comprising lifting and coveying devices situated at the face ends and at the loading opening with which the cover can be lifted out of its closed position and can be moved at the outer circumference of the hood in circumferential direction while releasing the opening in open position and can be moved back from the open position over the opening and be lowered into the closed position.

14 Claims, 13 Drawing Figures

PRESSURE-TIGHT VACUUM CHAMBER OF AN ELECTRON BEAM ENGRAVING MACHINE FOR ELECTRON BEAM ENGRAVING OF PRINTING CYLINDERS FOR PRINTING TECHNOLOGY

In printing technology, particularly in rotogravure, engraved printing cylinders are employed for producing the printed products, these printing cylinders being clamped in the printing machines and being inked with the corresponding inks. The ink is transferred from the printing cylinder onto the material to be printed. U.S. Pat. Nos. 3,246,970 and 3,404,254 already disclose that printing cylinders for printing technology be engraved by means of a high-energy, focussed electron beam. Since a correspondingly focussed electron beam can only be generated in a vacuum, the electron beam exit from the electron beam generator and the printing cylinder to be engraved are situated in a vacuum vessel. Since these printing cylinders have considerable dimensions and must be placed in rotation and conducted axially past the beam for engraving, vacuum vessels which have more than twice the length of the printing cylinders and a diameter which is greater than that of the printing cylinder itself are required. Since the printing cylinders are introduced into such a vacuum chamber from the outside and the vacuum chamber is subsequently closed again, high demands are made of the vacuum chamber with respect to stability and tightness, since electron beam engraving can only occur in an adequately high vacuum.

Screw covers or covers restrained by means of individual screws are already known for sealing pressure vessels. Such covers, however, are not very user-friendly and, given the high mechanical strength required here, they have a correspondingly high weight and can only be removed or applied with corresponding lifting gear.

It is therefore the object of the present invention to create a pressure-tight vacuum chamber for the acceptance of printing cylinders for engraving printing cylinders by means of [an] electron beam which can be opened and closed in a simple way and which leads to low set-up times for the machine.

The invention achieves this by means of the features recited in the characterizing part of claim 1. Advantageous developments are recited in subclaims 2 through 11.

The invention shall be set forth in greater detail below with reference to FIGS. 1 through 12. Shown therein are.

Figure 1:
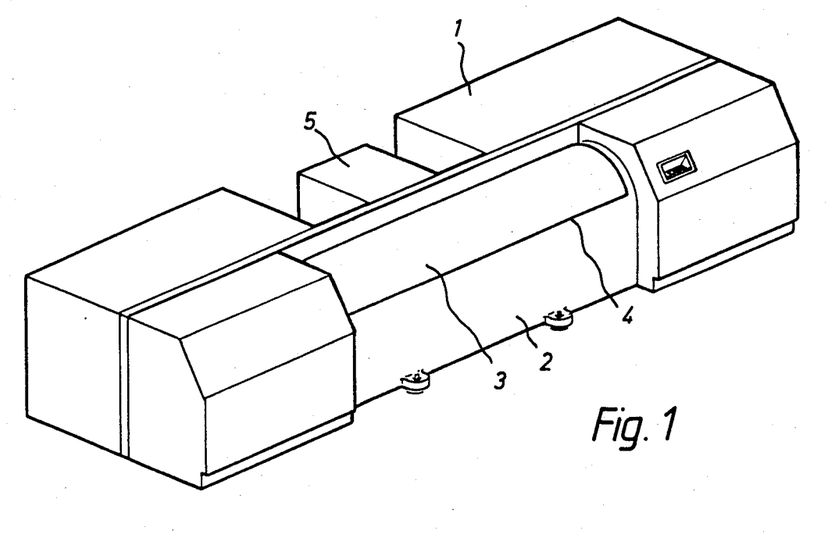
FIG. 1 a perspective view of an electron beam engraving machine with closed cover.

FIG. 1 shows an electron beam printing form engraver 1 which comprises a pressure-tight vacuum vessel 2, i.e. a pressure chamber which is closed with a cover 3. A gravure cylinder (not shown) is introduced into the engraver 1 from the top through the cover opening 4 of FIG. 2. For opening the vessel, the cover 3 is lifted out of the opening 4 and is displaced into its open position by means of special conveying devices provided at its ends, these conveying devices to be shown and set forth in detail later. An electron beam gun 5 is flanged to the vacuum vessel in the central region of the engraver, the electron beam exit aperture 6 thereof being directed within the pressure vessel 2 onto the printing cylinder (not shown). At its face ends, the printing cylinder is held by collet chucks during operation and is placed in rotation by means of a motor and is axially conducted past the electron beam for engraving.

Figures 3, 3A:
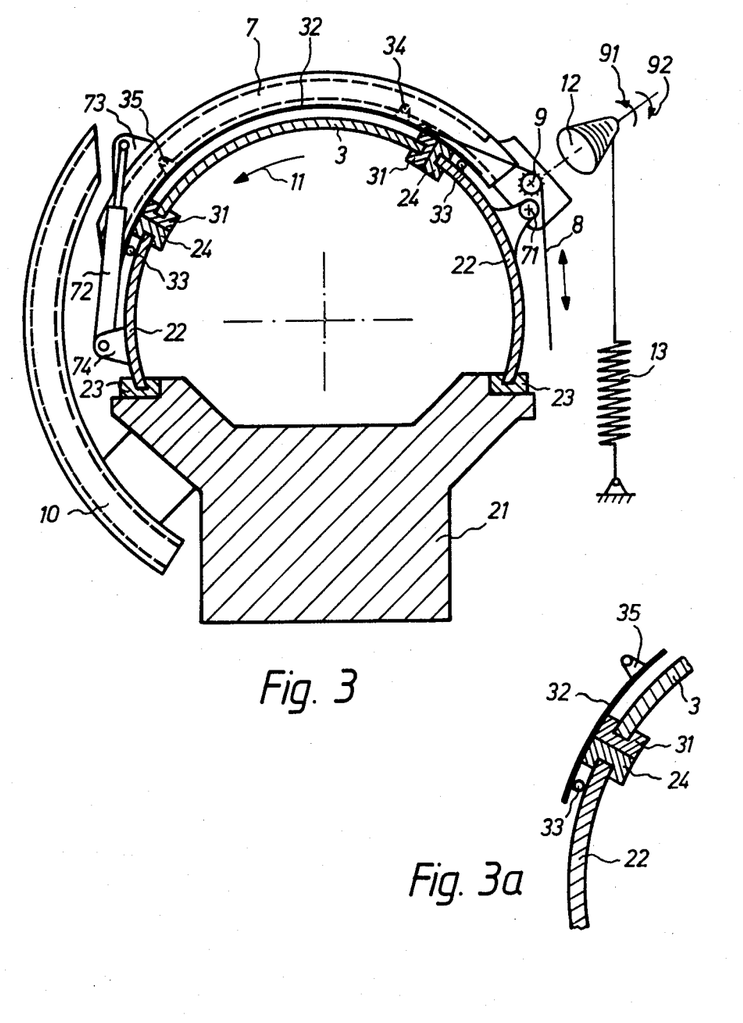
FIG. 3 a cross-section through the vacuum vessel, the cover and the actuation mechanism in the closed condition of the cover.
FIG. 3a an excerpted drawing of the seal of the cover.

FIG. 3 shows a section through the vacuum vessel 2 from which the structure of the vacuum vessel and of the cover may be seen. The printing form engraver is fundamentally composed of a lower part 21 similar to the machine bed on which a hood 22 is placed pressure-tight. The hood 22 is composed of a barrel-like arch which lies against a sealing surface 23 which surrounds the entire lower part. The cover 3 can be produced such that it is sawn from the hood as a segment. For the purpose of sealing the cover with the hood, bearing surfaces 24 at the hood and bearing surfaces 31 at the cover are respectively applied, the cover lying thereon at the hood opening. What is guaranteed by means of this type of cover design and cover seating is that no lateral forces but only forces residing perpendicular to the abutting surfaces arise at the joints.

The cover comprises an outer part 32 which is mated to the curvature of the cover and projects beyond the joints and comprises a ring seal 33 at its edge which assumes the vacuum sealing of the cover. The sealing zone is set forth in greater detail in FIG. 3a. As already mentioned, the supporting surfaces 31 and 24 lie against one another and the ring seal 33 which surrounds the cover at all sides assumes the sealing between hood and outer cover part.

The outer cover part 32 comprises rollers 34 and 35 which engage into an annular rail 7. The annular rail 7 is hinged to a laterally situated pivot point 71 as a curved layer. The annular rail 7 with the cover 3 can be lifted by pivoting around the pivot point 71, being thus lifted by means of a chain 8 which is guided via a deflection roller 9 and which engages at the annular rail 7 at a distance from the pivot point 71. This can ensue by means of a lifter member 72 or by means of the chain 8 or by means of both. The lifter member 72 which can be hydraulically actuated engages at the annular rail 7 at a bearing block 73 and engages at the hood 22 at the bearing block 74. As a result of this lifting of the annular rail 7, a connection to a second annular rail 10 situated laterally with respect to the over is produced, this second annular rail 10, together with the annular rail 7 producing a circular guide path within which the cover can glide on its rollers 34 and 35 and be displaced in arrow direction 11. The opening of the vacuum vessel then ensues such that the cover is moved in the annular rails 7 and 10, this being shown in greater detail in FIGS. 4, 5 and 6 in its individual intermediate phases.

Figure 4:
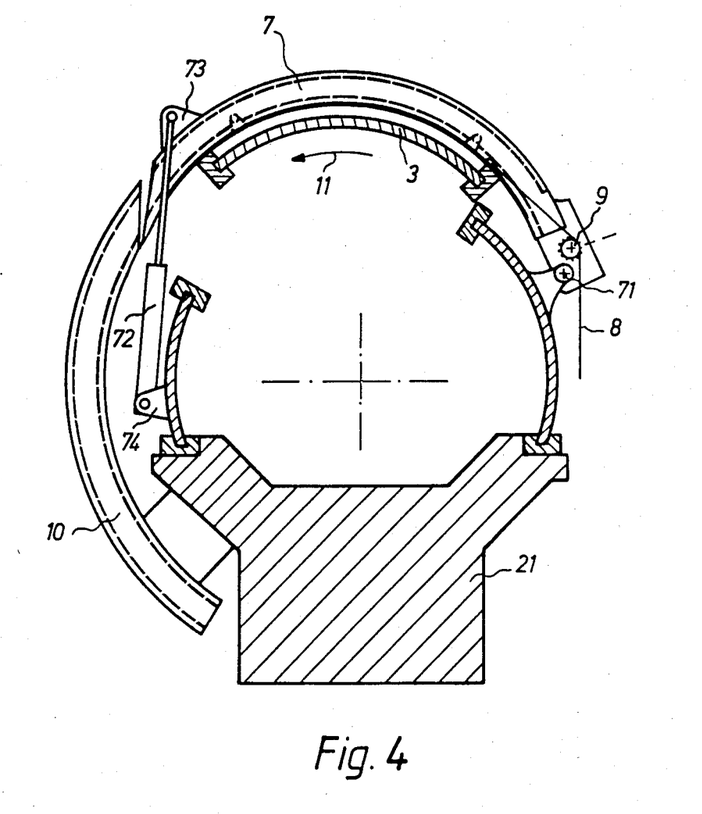
FIG. 4 a cross-sectional view in accord with FIG. 3 with lifted cover.
Figure 5:
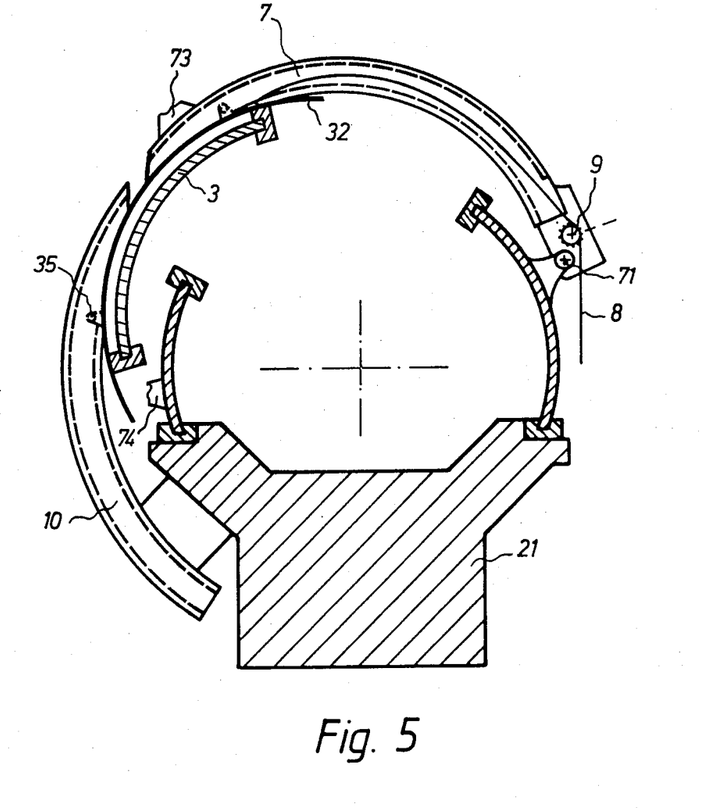
FIG. 5 a cross-sectional view in accord with FIG. 3 having a cover which has been partially displaced to the side.
Figure 6:
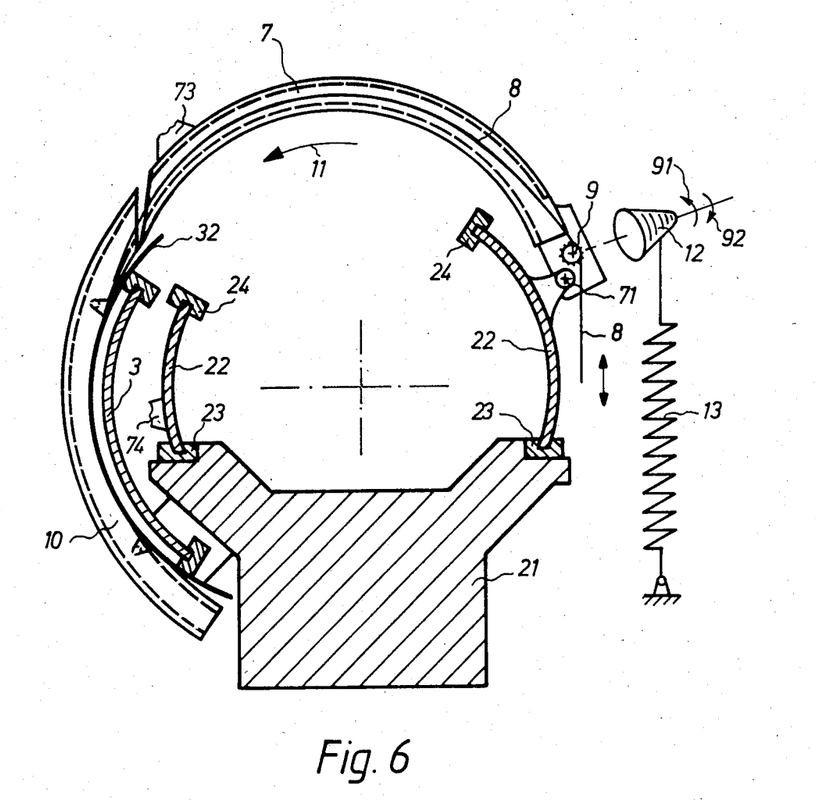
FIG. 6 a cross-sectional view of FIG. 3 with opened cover in the final position.

FIG. 3 shows the cover 3 in its closed condition; FIG. 4 in its lifted condition, whereby the lifting of the annular rail 7 ensues by means of the lifter member 72. FIG. 5 shows the cover in roughly its half-opened condition and FIG. 6 shows it in its completely opened condition, whereby the lifter element 72 has not been shown in FIGS. 5 and 6 for reasons of clarity. The closing of the cover proceeds correspondingly opposite, whereby the cover is lowered at the end of the closing operation and re-assumes the position shown in FIG. 3.

The chain wheel 9 is connected via a rod 90 to a pulley 12 which is influenced by a tension spring 13 which is secured at one end to a stationary point. The spring serves the purpose of weight compensation of the cover and the pulley 12 is helically fashioned because of the different forces occurring at the chain dependent on the position of the cover 3. The spring 13 additionally has a rising spring characteristic. The slope of the pulley and spring characteristic are dimensioned such that the restoring force which is transmitted by the wheel 9 onto the chain 8 increases with increasing dislocation of the cover from its closed position in the direction toward "opening".

In order to carry out the opening and closing of the cover uniformly and without tilting the cover, two such identical cover guidance mechanisms as shown in FIGS. 3 through 6 can be provided, namely at each of the face ends of the cover. It is then sufficient for only one of the two mechanisms to be equipped with a drive motor which acts on the chain wheel 9 for driving. The second cover guide mechanism is driven by the torsionally shift shaft 90 which connects the chain wheel 9 of the cover guide mechanism to the chain wheel 9 of the other cover guide mechanism. The motor which turns the chain wheel in arrow directions 91 or, respectively, 92 shall be set forth in greater detail later in FIG. 7. The lifting of the cover 3 and the pivoting of the guide rail 7 ensue by means of a lifter member 72. The guide rail 7 is lifted and engages with the rail 10 so that the cover—as a consequence of its dead weight—can subsequently assume the positions shown in FIGS. 4, 5 and 6 upon rotation of the wheel 9 in direction 91. The closing of the cover ensues in that the motor exerts a force on the chain 8 which turns the chain wheel 8 in arrow direction 92. When the cover abutts, then the guide rail 7 is again lowered and the cover is in its closed condition, ie. in the position shown in FIG. 3.

Figure 2:
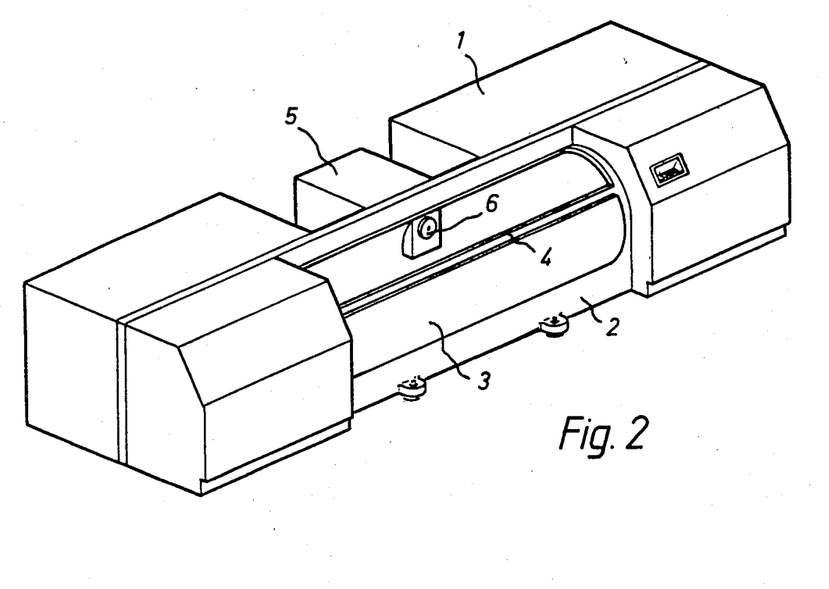
FIG. 2 a perspective view of an electron beam engraving machine with opened cover.
Figure 7:
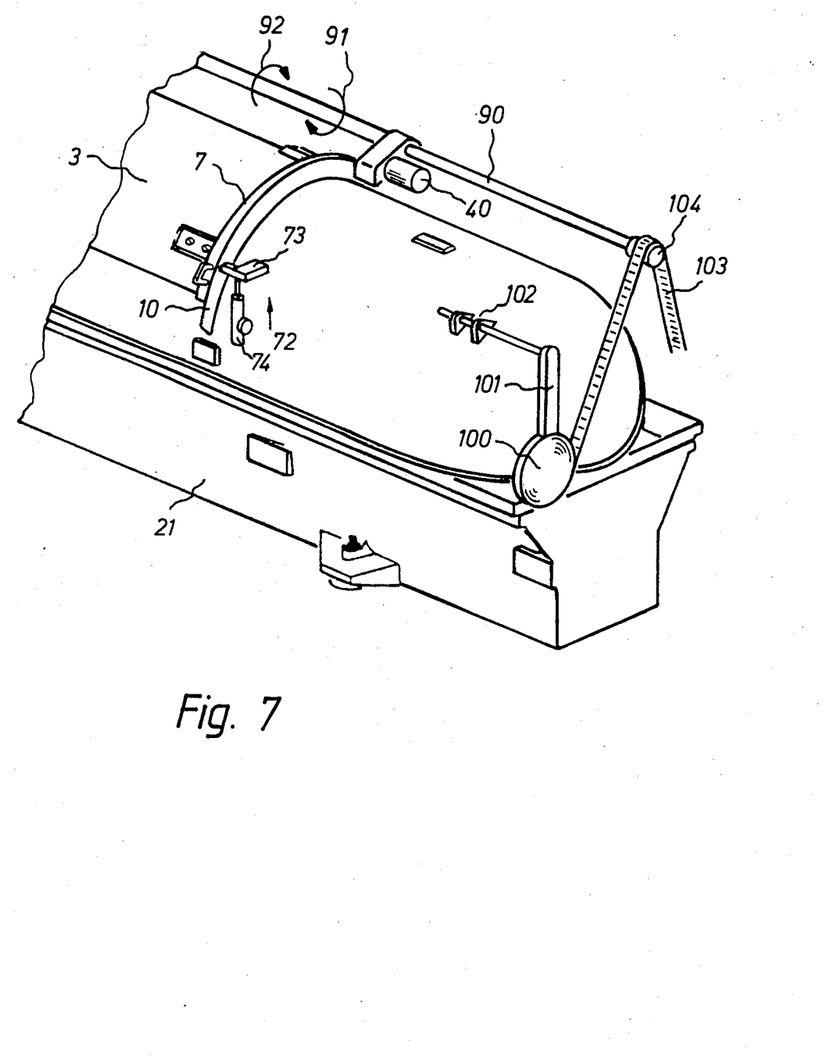
FIG. 7 a perspective view of a further embodiment of the invention comprising a counterweight for the cover which is designed as a pendulum.

FIG. 7 shows the electron beam engraver 1 shown in FIGS. 1 and 2 in a perspective view without cladding and without electron gun 5 in order to be able to explain the actuation mechanism of the cover 3 in greater detail. The annular rails 7 and 10 are visible at both sides of the cover 3, the cover being brought from the open into the closed position or, respectively, from the closed into the open position with these, as already set forth in FIGS. 3 through 6 which relates to the actuation of the cover mechanism. Instead of the pulley 12 and the spring 13, a motor 40 is provided, this motor 40 engaging at the toothed wheel 9 of FIG. 3 which is seated on the rod 90. A counterweight 101 has been provided in FIG. 7 instead of the spring 13 of FIG. 3, this counterweight 100, when the cover is moved, being brought into the position shown in FIG. 10 via a lever 101 hinged in a bearing 102 at the cover 3 by means of a chain 103 which runs over a toothed wheel 104 of the rod 90. The chain 103 is secured to the weight 100 and lifts the weight when the rod 90 is rotated in arrow direction 92.

Figure 8:
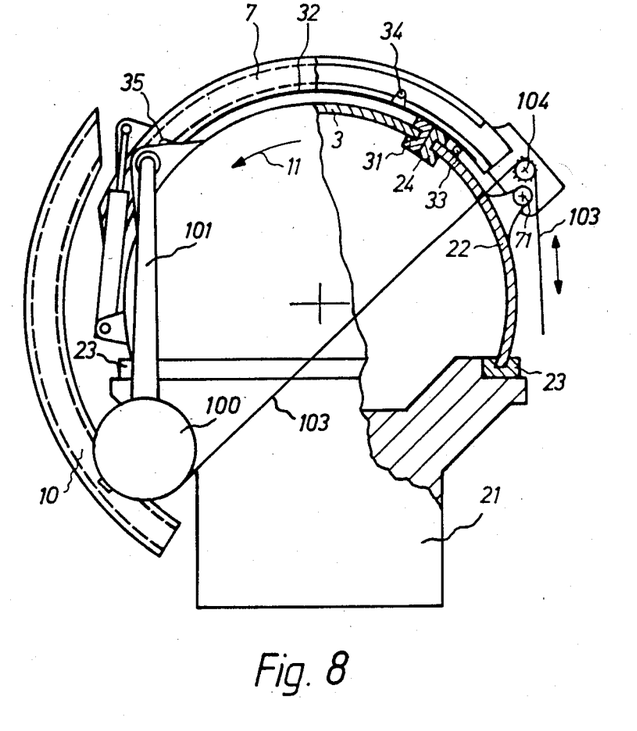
FIG. 8 the arrangement of FIG. 7 given a closed cover.
Figure 9:
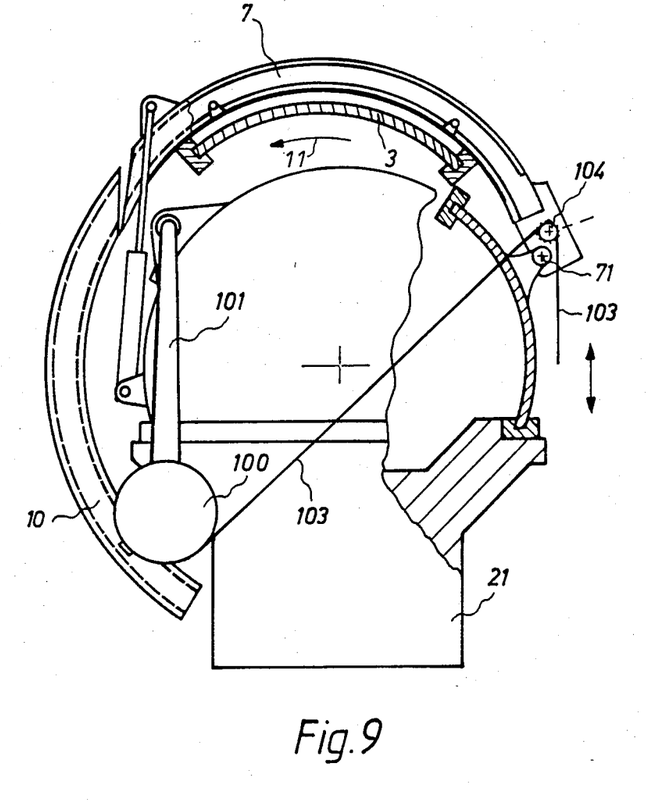
FIG. 9 the arrangement of FIG. 8 given a lifted annular rail.
Figure 10:
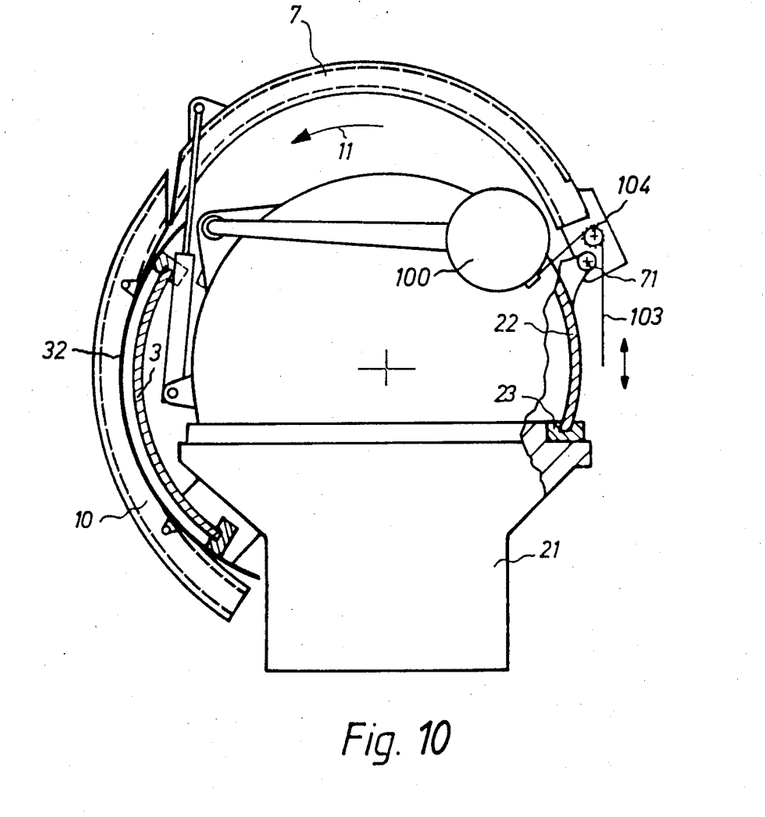
FIG. 10 the arrangement of FIG. 9 given an opened cover.

FIG. 8 shows the position of the weight 100 in its idle position, ie. given a closed cover 3; FIG. 9 shows it given a slightly lifted cover; and FIG. 10 shows it given an opened cover 3.

Figure 11:
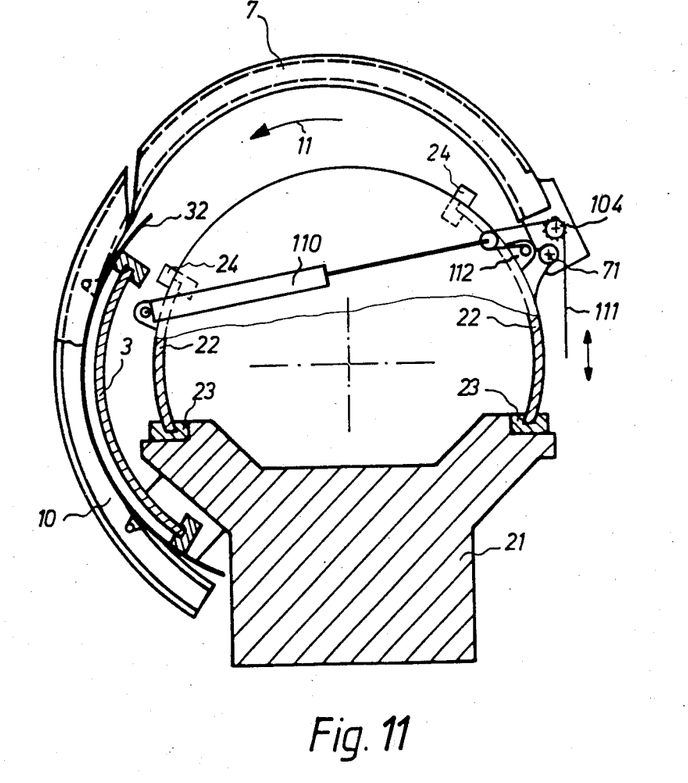
FIG. 11 a cross-sectional view through a further modification of the invention comprising a lifter element as compensation means for the weight of the cover.

FIG. 11 shows a further embodiment of the invention wherein the counterweight is replaced by a further lifter member 110 for compensating the cover weight. The lifter member 110 which is preferably hydraulically or pneumatically actuated engages, on the one hand, at a cable pull 111 which attacks a toothed wheel 104 secured to the rod 90 and, on the other hand, engages at a bearing 112 of the hood 22. The force exerted on the lifter member 110 is dimensioned in accord with the restoring force of the weight 100.

Figure 12:
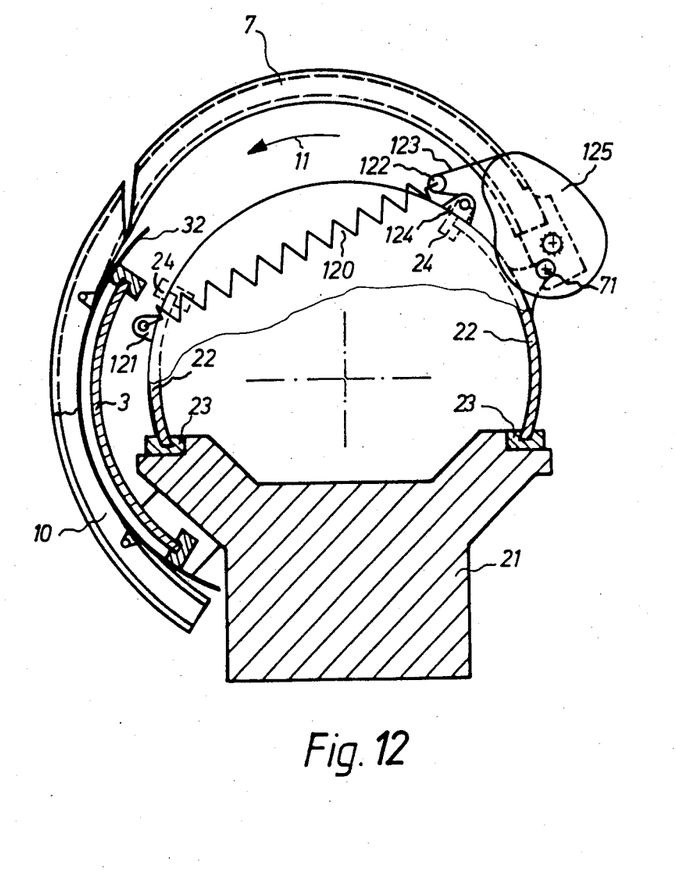
FIG. 12 a cross-sectional view of a further modification of the invention comprising a spring and a cam plate as weight compensation for the cover.

FIG. 12 shows a further embodiment of such a compensation means. A spring 120 is provided, one end thereof engaging at a bearing 121 of the hood 22 and, via a roller 122, the other end thereof engaging in a cable 123 which has one end secured at a bearing 124 on the side of the hood 22 at which the rod 90 is situated. The cable 123 is guided and secured via a cam plate 125, whereby the cam plate is situated on the rod 90. The curvature of the cam plate 90 is selected such that it produces the power curve arising due to the weight 100 at the rod 90, producing this together with the spring 120 and the cable 123.

We claim:

1. Pressure-tight vacuum chamber of an electron beam engraving machine for the acceptance of printing cylinders to be engraved, characterized by a lower part similar to a machine bed, by a vacuum hood placed pressure-tight on said lower part, said vacuum hood being fashioned as a barrel-like arch and being placed on a sealing lip surrounding said lower part at its edge, by a loading opening for said printing cylinders which is situated in the upper central region of said hood and extends in longitudinal direction of said hood, by a cover lowerable into said loading opening and sealable to said loading opening, and by lifting and conveying means situated at the face ends of said cover and of said loading opening, said cover being liftable out of its closed position therewith and being displaceable at the outer circumference of said hood in circumferential direction while releasing said opening in its open position and being returnable therewith from said open position over said opening and being lowerable into its closed position.

2. Vacuum chamber according to claim 1, characterized in that said lifting and conveying means are respectively composed of a pair of annular rail segments situated at each of the face ends of said opening, said pairs of annular rail segments forming annular guide paths for the transport of said cover between the closed position and the opened position, whereby said cover is suspended in a first segment of each pair by means of rollers guided in said annular segment, each first segment being pivotably seated by a bearing at one end for lifting said cover, and said other segment of each pair, as an extension of said first segment, being stationarily situated at said vacuum chamber at that side lying opposite the bearing of said first segment.

3. Vacuum chamber according to claims 1 or 2, characterized in that means for pivoting said first segment and, thus, for lifting said cover, as well as means for conveying said cover within said annular rail segments between the closed and opened positions are provided.

4. Vacuum chamber according to any one of the claims 1 through 3, characterized in that a conveying chain reversibly driven via a chain wheel is provided as part of the lifting and conveying means, said conveying chain pulling at said cover in a circumferential direction opposite the dead weight of said cover; and in that the drive of said chain wheel is provided with a force compensation means for weight compensation of said cover when conveying said cover between the closed and opened positions.

5. Vacuum chamber according to claim 4, characterized in that said force compensation means comprises a pulley having helical slope is being connected to said chain wheel, a stationary spring attached said pulley via a cable which can be wound up by means of said pulley.

6. Vacuum chamber according to claim 5, characterized in that the force of said force compensation means increases disproportionately in accord with the tensile force exerted by said cover on said chain.

7. A vacuum chamber according to claim 3, wherein said means for pivoting includes a lifter element connected between the first segment of each pair and said hood.

8. A vacuum chamber according to claim 1, wherein said lifting and conveying means includes a rod with a chain wheel, bearing means for mounting the rod on the hood for rotation on an axis extending parallel to the longitudinal direction, a motor for rotating the rod, and a conveying chain being engaged by the chain wheel and being connected to said cover.

9. A vacuum chamber according to claim 8, which includes a weight compensation means for said cover being connected to said rod to oppose rotation of the rod to move the cover to the opened position.

10. A vacuum chamber according to claim 9, wherein said weight compensation means includes a counterweight constructed as a pendulum.

11. A vacuum chamber according to claim 9, wherein said weight compensation means includes a lifter member which is connected to said rod by means of a lever whose force is dimensioned so that the weight of said cover is compensated in every angular position of said cover.

12. A vacuum chamber according to claim 9, wherein said weight compensation means includes a spring, a cam plate connected to said rod and a cable pull attached to the spring and cam plate, said cam plate having a shape and the spring having a spring force dimensioned so that the weight of said cover is compensated during movement onto each of the individual angular positions thereof.

13. A pressure-tight vacuum chamber for an electron beam engraving machine, said chamber accepting a printing cylinder to be engraved and comprising a lower part similar to a machine bed, a vacuum hood having a cylindrical cross-configuration with a longitudinally extending opening provided with sealing lips for surrounding the lower part to form a pressure-tight seal therewith, said hood having a loading opening for the printing cylinders being situated in an upper central region of the hood and extending in a longitudinal direction of the hood, a cover for sealingly closing the loading opening and first means situated at the opposite ends of the loading opening for lifting the cover out of its closed position and conveying the cover around the outer circumference of the hood in a circumferential direction to an opened position clear of the opening so that a printing cylinder can be removed from the chamber and a new cylinder placed therein.

14. A pressure-tight vacuum chamber according to claim 13, wherein the first means includes a pair of annular rail segments situated at each end of the loading opening, each pair of annular rail segments forming an annular guide path for conveying of the cover between the closed and opened positions, said cover being suspended on one segment of each pair by means of rollers guided in the one segment, each of the one segments being pivotably mounted at one end for movement from a first position with the cover in a closed position to a second position lifting the cover from said closed position and the other segment of each pair being stationarily mounted on the hood to be in alignment with the one segment when it is in the second position to form said annular path.

* * * * *